Figure 1:
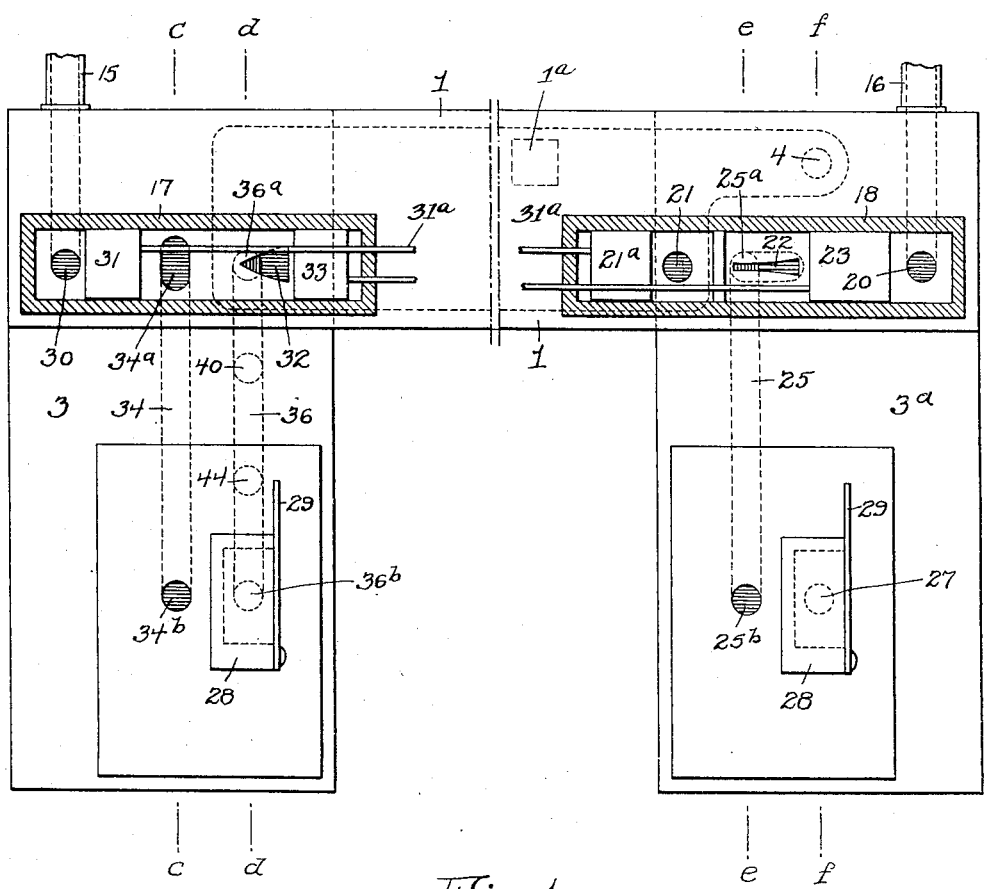

G. E. MARTIN.
DEVICE FOR CONTROLLING FLOW OF AIR IN MECHANICAL MUSICAL INSTRUMENTS.
APPLICATION FILED AUG. 17, 1912.

1,174,595.

Patented Mar. 7, 1916.
2 SHEETS—SHEET 1.

WITNESSES
Hamilton D. Turner
Kate A. Beadle

INVENTOR
GEORGE E. MARTIN
BY HIS ATTORNEY
Harry Smith

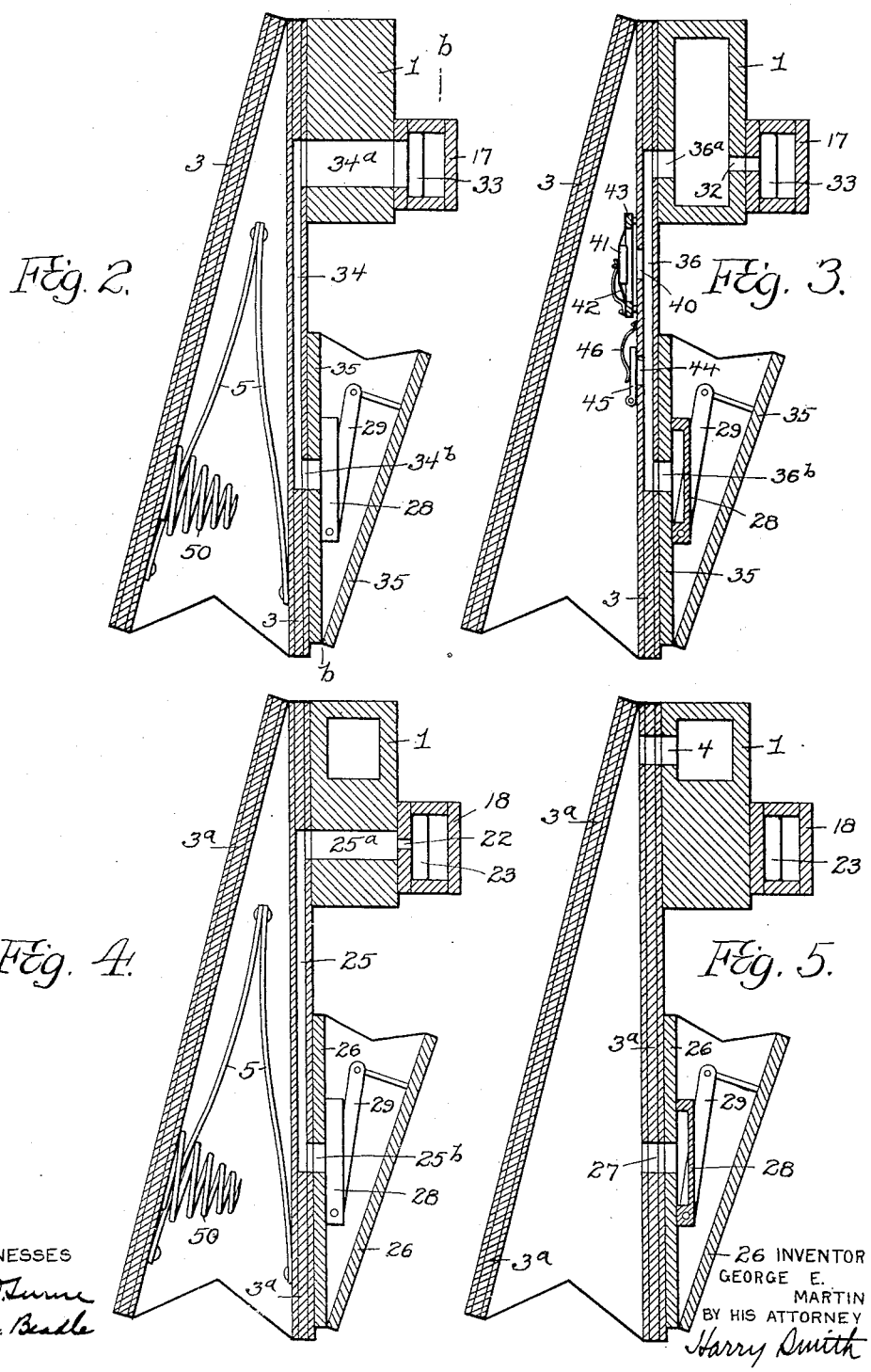

UNITED STATES PATENT OFFICE.

GEORGE E. MARTIN, OF PHILADELPHIA, PENNSYLVANIA.

DEVICE FOR CONTROLLING FLOW OF AIR IN MECHANICAL MUSICAL INSTRUMENTS.

1,174,595. Specification of Letters Patent. Patented Mar. 7, 1916.

Application filed August 17, 1912. Serial No. 715,673.

*To all whom it may concern:*

Be it known that I, GEORGE E. MARTIN, a citizen of the United States, residing in Philadelphia, Pennsylvania, have invented certain Improvements in Devices for Controlling Flow of Air in Mechanical Musical Instruments, of which the following is a specification.

The object of my invention is to so construct the vacuum-controlling valves, chambers, and passages of pneumatically operated musical instruments as to connect the main wind chest with the hammer pneumatics and roll motor through intervening regulating devices which are free from external pipes or passages, and to improve the action of the regulating devices. This object I attain in the manner hereinafter set forth, reference being had to the accompanying drawings, in which—

Figure 1 is a view partly in front elevation and partly in section on the line $b$—$b$, Fig. 2, omitting the main suction bellows and the pedal mechanism for operating the same and also omitting the cover of the storage bellows; Fig. 2 is a transverse section on the line $c$—$c$, Fig. 1; Fig. 3 is a transverse section on the line $d$—$d$, Fig. 1; Fig. 4 is a transverse section on the line $e$—$e$, Fig. 1, and Fig. 5 is a transverse section on the line $f$—$f$, Fig. 1.

Referring in the first instance to Fig. 1 of the drawings, 1 represents the main wind chest of the vacuum apparatus, from which the air is withdrawn through a suitable passage $1^a$ by means of alternately or intermittently acting suction bellows as usual.

3, $3^a$ are what are termed "storage bellows" which occupy a position at the ends of the wind chest, the bellows $3^a$ being in constant communication with the wind chest through a passage 4 (Figs. 1 and 5) and each bellows having a constant tendency to collapse under suction, which tendency is constantly resisted by reason of the tendency of an internal spring 5 to expand the bellows, the latter thereby serving to equalize the condition of partial vacuum maintained in the wind chest and prevent pulsations therein due to the alternate action of the main exhaust bellows.

At one end of the wind chest 1 is a pipe 15 which communicates with the hammer pneumatics and at the other end of said wind chest is a pipe 16 which communicates with the roll motor, the pipe 15 communicating with the wind chest through a valve box 17 mounted thereon, and the pipe 16 communicating with the wind chest through a valve box 18.

I will first describe the valves and passages employed in connection with the roll motor control pipe 16 and valve box 18. The pipe 16 communicates with one end of the valve box through a passage 20, and said valve box also communicates directly with the interior of the wind chest through a passage 21. When this passage 21 is open, therefore, the full force of the partial vacuum maintained in the wind chest 1 is exerted through the pipe 16 and the roll motor is operated at full speed, this condition being maintained during the rerolling operation when high speed is desired. When, however, the winding roll is being operated by the motor mechanism, as during the playing of the instrument, the passage 21 is closed by means of a valve $21^a$ in the valve box 18 and communication between the pipe 16 and the wind chest must then be effected by other means whereby a slower operation of said motor mechanism is caused, this operation being under control so that the speed of the motor mechanism can be varied to accord with the desired tempo of the piece of music which is being played. For this purpose a port 22 controlled by a valve 23 communicates with a passage 25 formed in the fixed front member of the storage bellows $3^a$, said passage having, at its upper end a port $25^a$ and at its lower end a port $25^b$, the upper port $25^a$ being formed partly in the fixed member of the bellows casing $3^a$ and partly in an otherwise closed portion of the wind chest 1, and the lower port $25^b$ being formed partly in the fixed member of the casing $3^a$ and partly in the fixed member of a governor bellows 26, as shown in Fig. 4. The governor bellows 26 is mounted upon the depending portion of the storage bellows $3^a$ and is in communication with the wind chest through said storage bellows, through the passage 4 at the upper end of the same, as shown in Fig. 5, and through a port 27 formed partly in the fixed member of the bellows $3^a$ and partly in the fixed member of the governor bellows 26, as shown in Fig. 5.

The port 27 on the interior of the bellows 26 is covered by a hood 28 open at one side where it coöperates with a pivoted and swinging valve blade 29, the latter being connected at its free end to the movable member of the bellows 26 whereby, as the latter contracts or expands, the size of the passage through the hood 28 will be contracted and expanded accordingly and the force of the air flowing through the passages communicating with the port 22 will thereby be regulated so as to accord closely with the degree of vacuum maintained in the wind chest.

The pipe 15 which communicates with the hammer pneumatics communicates with the interior of the valve box 17 through a passage 30 with which coöperates a valve 31 operated by the same rod 31ª which operates the valve 21ª, whereby, as the latter is moved so as to open the reroll passage 21 of the valve box 18, the valve 31 will be moved so as to close the passage 30 and thereby cut off communication between the wind chest and the hammer pneumatics during the rerolling operation, movement of the valve 21ª so as to close the reroll passage 21 of the valve box 18 causing movement of the valve 31 so as to again uncover the passage 30 leading to the hammer pneumatics.

The wind chest 1 is in direct communication with the interior of the valve box 17 through a tapering port 32 with which coöperates a sliding valve 33 in said valve box, as shown in Fig. 1, whereby the area of this direct communication can be readily varied by adjustment of the valve to vary the force of the stroke of the hammer pneumatics to accord with the expression demanded by the piece of music which is being played. In order, however, to provide for communication between the interior of the valve box 17 and the wind chest when the valve 33 is entirely closed and also to provide communication between the wind chest and the storage bellows 3 said valve box communicates with a passage 34 in the fixed front member of the storage bellows 3, said passage 34 having, at its upper end, a port 34ª formed partly in the fixed member of the bellows 3 and partly in an otherwise closed portion of the wind chest, and at its lower end a port 34ᵇ formed partly in the fixed member of the storage bellows 3 and partly in the fixed member of a governor bellows 35, as shown in Fig. 2.

The interior of the governor bellows 35 communicates with the wind chest 1 through a passage 36 formed in the fixed member of the storage bellows 3, this passage having ports 36ª and 36ᵇ at its upper and lower ends, respectively, as shown in Fig. 3. The port 36ᵇ is provided with a hood 28ª and pivoted swinging valve blade 29ª constructed and operated in a manner similar to the corresponding hood 28 and valve 29, shown in connection with the governor bellows 26.

For the purpose of rendering effective the equalizing action of the storage bellows 3 the interior of the same communicates with the passage 36 through a port 40, as shown in Fig. 3, but this port is controlled by a valve 41 carried by a flexible diaphragm 42 which is secured to a ring 43 mounted in the interior of the bellows 3, as shown in Fig. 3, so that in case of any sudden increase in the degree of vacuum maintained in the wind chest, such for instance as would be caused by a sudden or forcible movement of a pedal in order to accentuate a note, the valve 41 will be drawn down so as to close the port 40 and thereby deprive the wind chest 1 of the equalizing or regulating effect of the bellows 3 and permit the hammer pneumatic which is being actuated at that particular time to operate with an exceptional degree of force. The interior of the storage bellows 3 also communicates with the passage 36 through a port 44 normally closed by a pivoted and swinging check valve 45 held in the closed position by a spring 46, and opening toward the interior of the bellows 3, this check valve opening to permit flow of air into the bellows 3 when the operation of the suction bellows is arrested. By the location of the passages 25, 34 and 36 and their coöperating ports in the fixed members of the bellows 3 and 3ª instead of using outside pipes and pipe connections not only is the construction simplified, cheapened and rendered more compact but the likelihood of injury to which external pipes and pipe connections are subject is avoided.

To facilitate the formation of the passages and their ports the inner members of the bellows 3 and 3ª are, by preference, constructed of two or more plies, three of such plies being shown in the present instance, so that the various ports can be formed in the outer plies and the connecting passages in the intermediate ply by simple boring or routing operations.

In order to increase the tension upon the bellows 3 or 3ª as the latter approaches the limit of contraction I supply said bellows with a coiled spring 50 in addition to the spring 5, as shown in Figs. 2 and 4, said spring 50 being of such length that it will not come into play until the bellows has been partially contracted but after that time will add its resistance to that of the spring 5 to resist further contraction of the bellows.

I claim:

1. The combination, in a mechanical musical instrument, of a wind chest and a storage bellows with a passage providing communication between the two, said passage having a port communicating with the storage bellows, a valve for closing said port, a flexible diaphragm carrying said valve, and a raised support for said diaphragm contained within the storage bellows.

2. The combination, in a mechanical musical instrument, of a wind chest and a storage bellows, a passage connecting said bellows and wind chest, said passage having two ports communicating with the storage bellows, a spring-actuated check valve normally closing one of said ports but permitting flow of air from the wind chest into the bellows, and a diaphragm-carried valve for closing the other of said ports upon a sudden increase in the degree of vacuum maintained in the wind chest.

In testimony whereof, I have signed my name to this specification, in the presence of two subscribing witnesses.

GEORGE E. MARTIN.

Witnesses:
Geo. W. Davis,
Jacob Schiller.